Patented Jan. 20, 1942

2,270,299

UNITED STATES PATENT OFFICE 2,270,299

GEOCHEMICAL PROSPECTING

Leo Horvitz, Houston, Tex., assignor to Esme E. Rosaire, Houston, Tex.

No Drawing. Application March 23, 1939, Serial No. 263,669

7 Claims. (Cl. 23—232)

The invention relates to prospecting for oil, gas and related deposits by earth sampling to determine the presence of hydrocarbons and other substances which leak or result from leakage from such deposits and which may serve as an indication of the proximity of the deposits.

It has been found that the fluids which leak from the deposits become adsorbed, absorbed, occluded or otherwise entrained in the soil thru which they pass. An attempt to obtain directly therefrom traces of such gases as methane, ethane, hydrogen and other hydrocarbons higher than ethane results generally in a sample greatly diluted by atmospheric air. One successful method of sampling is that of taking samples of actual soil which may be confined and subjected to treatment to liberate the desired substances. This method is disclosed in copending application, Serial No. 107,497, filed October 24, 1936, for Geophysical prospecting method.

In accordance with the present invention it has been found that liberation of the sought substances from the soil may be accomplished by the use of an acid or acids, particularly acids of sufficient strength to decompose whatever carbonates may be present in the soil. Thus, with the use of acid, samples may be obtained which contain a sufficiently high significant content of sought gases to make the present procedure more efficient than the method of the above noted application in which the samples may, in some instances, be lean in the sought constituents.

An object of the present invention is to provide an improvement in the art of geochemical exploration by liberating from the soil, substances which are indicative of the location of valuable subsurface deposits.

It is also an object of the invention to utilize an acid in the treatment of soil to produce from the sample constituents sought as an indication of the location of hydrocarbon deposits.

A further object of the invention is to provide a method of obtaining gaseous samples either directly from the earth in situ or from a specimen of soil so that such samples contain a high percentage of the significant substance which is removably entrained in the soil.

Another object is to treat the soil to release in gaseous form the significant constituents which are in some form entrained therein.

Another object is to collect a gaseous sample by a process whereby the entrained constituents are evolved during or shortly before the process of taking the sample.

A still further object is to apply acid to soil to assist in obtaining therefrom substances which are indicative of the proximity of valuable subsurface deposits.

These and other objects will be obvious from the present specification and appended claims.

For purposes of illustration it might be stated that when previously known technique was used in many exploration areas, the available quantity of ethane or other significant constituents in collected gaseous samples is such that three parts of significant gas per million parts of total gas sample may be considered as indicative of proximity to sought deposits whereas, in accordance with the present invention, a concentration of 100 or more parts of sought gas per million of total gas is obtainable in areas proximate the sought deposits. The most highly developed analytical equipment has a sensitivity in the order of one or two parts per million. Hence, in accordance with the invention determinations may be made from samples in which the concentration of significant constituents is well above the threshold of apparatus sensitivity. This not only provides a technique which is more economical and practical but one in which the contour lines of isoconcentration of significant constituents may be drawn with much higher accuracy and greater significance.

In its broadest aspect the invention includes the step of treating soil with an acid capable of disintegrating the carbonates in the soil. Such action is instrumental in obtaining much richer samples of gases including significant constituents indicative of the location and extent of subterranean deposits.

In accordance with the invention it is believed at present that the acid treatment above mentioned breaks up oolites or similar bodies present in the soil. In some cases at least, oolites are now believed to be small particles created by shells formed about gas nuclei. See, for example Science, January 13, 1939, page 27 "Gas bubbles as nuclei for oolites." Hence in accordance with this theory oolites could serve as bottles for these gas inclusions which are liberated in practicing the invention. As the oolites so far examined have been found to be composed of calcium carbonate, the acid treatment breaks down the shell and releases the gas. While this theory is offered as an explanation of the manner of obtaining unexpected volumes of gases, it is to be understood that the invention is not limited or defined by such proposed theory.

While the technique for practicing the invention may vary, a preferred procedure is that of obtaining soil samples in the field and transporting such samples to the laboratory for treatment whereby desired information is obtained.

An illustration of one manner of treatment of the individual samples is to first take a small portion, as for example say 10 grams, of the sample which is examined for moisture content. A dry sample equivalent of desired weight, preferably between 50 and 150 grams, is then placed in a container for analysis. This container is sealably connected to a gas collecting device and is evacuated to about one-tenth atmosphere which is approximately the vapor pressure of the liquids in the sample. This evacuation substantially eliminates soil gases and underground air entrapped in the sample.

A suitable acid is then added to the sample in sufficient quantity to decompose the carbonates in the sample. Any acid which will dissolve the carbonates is satisfactory and the quantity of acid used will of course depend upon the nature of the acid and the quantity of carbonates in the soil sample. When hydrochloric acid is used it has been found that from 100 cc. to 200 cc. is sufficient for treatment of a dry equivalent soil sample between 50 and 150 grams in weight.

The reaction of the acid with the sample liberates carbon dioxide and at the same time unexpectedly large quantities of hydrocarbon gases are liberated. Such liberation of gaseous products causes the pressure within the sample enclosure to rise to as much as one or more atmospheres. These products are admitted to a chamber of known volume, such chamber being partially filled with an absorbing solution such as potassium hydroxide whereby the carbon dioxide becomes absorbed.

The gaseous constituents within the chamber above the absorbing solution which may include the hydrocarbon gases will not be absorbed but remain in the chamber and may be withdrawn and analyzed whereby the objectives of the invention are realized.

It may be desirable that the sample and the acid in the soil sample chamber be additionally subjected to heat whereby entrained constituents not liberated by the reaction of the acid may be freed. Such liberation may be completed by the application of heat at about 100° C. for approximately thirty minutes.

A suitable liquid which will not readily absorb the gases may be then introduced into the soil sample chamber so that any gaseous products therein will be displaced into the sample receiving chamber with the previously collected gaseous sample. This sample is then ready for analysis to determine the amount of any or all of the hydrocarbons therein. Such analysis may comprise any of the known methods of gas analysis of sufficient accuracy to reveal the amount of hydrocarbons relative to the sample from which such constituents were obtained. It is preferred, however, that analysis be carried out in accordance with the disclosure of copending application Serial No. 183,960 filed January 8, 1938, for Means and method for analysis. In accordance with such invention the collected gaseous sample is subjected to fractionation whereby component parts of the sample are measured as a basis for determining the proximity of soil samples to buried deposits.

An alternative method embodying the invention consists in penetrating the top soil for a few feet with a bore hole. Suitable collection apparatus is arranged at the mouth of the bore hole to encompass the gaseous sample liberated within the bore hole. The bottom and/or adjacent wall of the bore hole are then subjected to the action of an acid to liberate from the soil a gaseous sample which is collected within the apparatus and which is subsequently analyzed to reveal the desired information.

Another and similar manner of practicing the invention includes the step of filling the bore hole with water to replace atmospheric air and air entrapped in the adjacent soil pores. Partial or subatmospheric pressure is then applied to the collecting apparatus to draw off underground air and entrapped soil gas which are normally discarded. An acid, preferably heavier than water is then introduced at the bottom of the hole as by a tube extending through the water to the bottom of the hole. Such acid is instrumental in liberating from the soil a gaseous sample which, due to continuation of the subatmospheric pressure, is drawn off for collection and analysis.

The invention also contemplates a technique which includes the use of an inhibited acid or an acid in solution with an inhibiting agent, some of the arsenates being suitable, so that the action of the acid is delayed for a predetermined period of time. In accordance with this modification the hole may be filled with the solution and the underground air and entrapped soil gas displaced before the liberating action on the soil occurs. Thus the hole may be filled with the inhibited acid solution and partial or subatmospheric pressure applied to draw off the underground air displaced by the liquid. This air is discarded. When the action of the acid on the soil takes place liberated gaseous constituents are collected in the manner above indicated.

It is believed obvious, both from a general knowledge of chemistry and from results obtained from experiments in carrying out the invention that any acid, organic or inorganic can be used in the practice of this invention. It is preferable for obvious reasons to use an acid of which the calcium salt is soluble. It has been found generally preferable to use hydrochloric acid, but in agricultural areas where the resulting chlorides would be objectionable, field collected gas samples may be liberated by the use of nitric acid. Where the liberation of gaseous samples is accomplished on soil samples in the laboratory, hydrochloric acid is to be preferred due to its strength, and its ease of handling together with the absence of danger in case of accidental spillage.

In general the term "entrained" as used in the specification and claims is intended to include any gas particles which have ben bottled, adsorbed, dissolved by or combined with the carbonate formations, and to distinguish from underground air and gas which is merely entrapped in the soil interstices.

The invention claimed is:

1. In the method of geochemical prospecting in which samples of soil gas obtained from spaced points in an area to be explored and analyzed for their content of hydrocarbons and derivatives thereof which constitute indications of leakage from subterranean petroliferous deposits, the step of securing the gas samples by treating the soil with an acid capable of disintegrating the carbonates therein, whereby entrained constituents are evolved in gaseous form.

2. In the method of geochemical prospecting in which samples of soil are collected at spaced points in an area to be explored, and treated for the recovery therefrom of a gas which is analyzed for components which have resulted from the leakage of fluids from subterranean petroliferous deposits, the step which comprises treating each sample with an acid to facilitate the liberation of entrained constituents therefrom.

3. A method of geochemical prospecting which comprises collecting samples of soil at spaced points in an area to be explored, confining each sample in a closed space, subjecting the sample while so confined to the action of an acid capable of disintegrating the carbonates contained therein, collecting the constituents liberated in gaseous form by the reaction of acid, and analyzing the gas so collected for constituents related to subterranean petroliferous deposits.

4. A method of geochemical prospecting which comprises collecting soil samples at spaced points in an area to be explored, treating each sample with an acid while reducing the pressure on said sample and heating it, collecting the constituents liberated in gaseous form by the reaction of the acid and the applied heat, and analyzing the gas so collected for constituents related to subterranean petroliferous deposits.

5. A method according to claim 2 in which the acid employed is hydrochloric acid.

6. A method according to claim 4 in which the acid employed is hydrochloric acid.

7. In the method of geochemical exploration the process of withdrawing from the soil the underground air and entrapped gaseous constituents contained therein and discarding such gases, subjecting the soil to the action of an acid capable of dissolving the carbonates contained therein, whereby gases adsorbed on the soil particles and contained in an occluded state within the carbonate particles are liberated, and analyzing the evolved gases for hydrocarbons and their derivatives which indicate the proximity of subterranean petroliferous deposits.

LEO HORVITZ.